United States Patent [19]
McMullen et al.

[11] 3,715,049
[45] Feb. 6, 1973

[54] RADIATOR PRESSURE CAP

[75] Inventors: Wesley W. McMullen, Flint; Tom B. Miller, Grand Blanc, both of Mich.

[73] Assignee: General Motors Corporation, Detroit, Mich.

[22] Filed: Oct. 20, 1971

[21] Appl. No.: 190,740

[52] U.S. Cl. ................................................220/44 R
[51] Int. Cl. ............................................B65d 51/16
[58] Field of Search ......................220/44, 40, 24 RC

[56] References Cited

UNITED STATES PATENTS 3,587,912   6/1971   Ohta et al. ..........................220/44 R
2,968,421   1/1961   Eshbaugh ..........................220/44 R
2,944,698   7/1960   Pipes et al. .....................220/44 R X Primary Examiner—George T. Hall
Attorney—S. Carter et al.

[57] ABSTRACT

This invention relates to a closure cap and more particularly to a radiator closure cap. The cap is to be used on automobile type radiators and provides for the automatic relief or release of pressure and vacuum in the radiator. Pressure and vacuum relief is accomplished at the center of the cap, through a common opening.

3 Claims, 3 Drawing Figures

PATENTED FEB 6 1973

3,715,049

INVENTORS
Wesley W. McMullen &
Tom B. Miller
BY
P. A. Faucher
ATTORNEY

RADIATOR PRESSURE CAP

Similar prior art caps or pressure and vacuum relief closures provide for automatically regulating the radiator pressure and vacuum and are generally of the type that have integral vacuum and pressure relief means, but such relief means are accomplished through separate and distinct locations of the cap. The patent to Eshbaugh U.S. Pat. No. 2,968,421, assigned to same assignee, is typical of the prior art. That is, a vacuum relief valve is generally located at the center of the cap while the pressure relief area of the cap is along the outside edge and lifts upwardly at the edge from around the filler neck upon which it seats. Since prior art caps use separate valves, for vacuum relief and pressure relief that open at different points or areas on the cap, any flow through the valve is in one direction only, either in or out, depending on whether the vacuum relief or pressure relief valve is functioning. Each valve opens just enough to overcome the spring pressure, and therefore foreign particles such as rust sediment, etc. are easily deposited and remain on the respective valve seats. Further, since the pressure relief valve is between the cap and the filler neck, everytime the cap is removed, the pressure relief valve would very likely be repositioned on the filler neck and as a result the opening pressure can be altered due to changes in the spring location due to the repositioning.

The present invention overcomes these problems by providing a cap that has the pressure relief valve that is not affected by changes of filler neck seat position when the cap is removed from the radiator. In the present invention, both the pressure relief valve and the valve seat are in the cap assembly. That is, the valve seat does not move when the pressure relief valve does, but once attached to the filler neck it remains in that position. Only the valve per se moves. This same pressure relief valve acts as a vacuum relief valve. That is, vacuum relief is accomplished through the same valve opening. Therefore, any dirt that might go through the valve because of an over pressure condition will subsequently be cleaned by the subsequent flow through the same opening upon vacuum relief. The cap of our invention seals tighter than prior art caps upon pressure increase due to the constant steady increase in pressure pushing against the diaphragm until the moment a common valve contacts a center post whereby the valve opens abruptly.

An object of the present invention is to provide a radiator cap having an integral vacuum and pressure relief valve.

Another object is to provide a cap that has a self-alignment feature.

A further object of the invention is to provide a cap that has an integral pressure and vacuum relief valve that will be self-cleaning.

Another further object is to provide a cap that has a pressure relief valve which does not seat on the filler neck, but has the valve integral with the cap assembly.

Other objects and advantages of the invention will appear from the following description taken in connection with the drawings in which.

Figure 1:
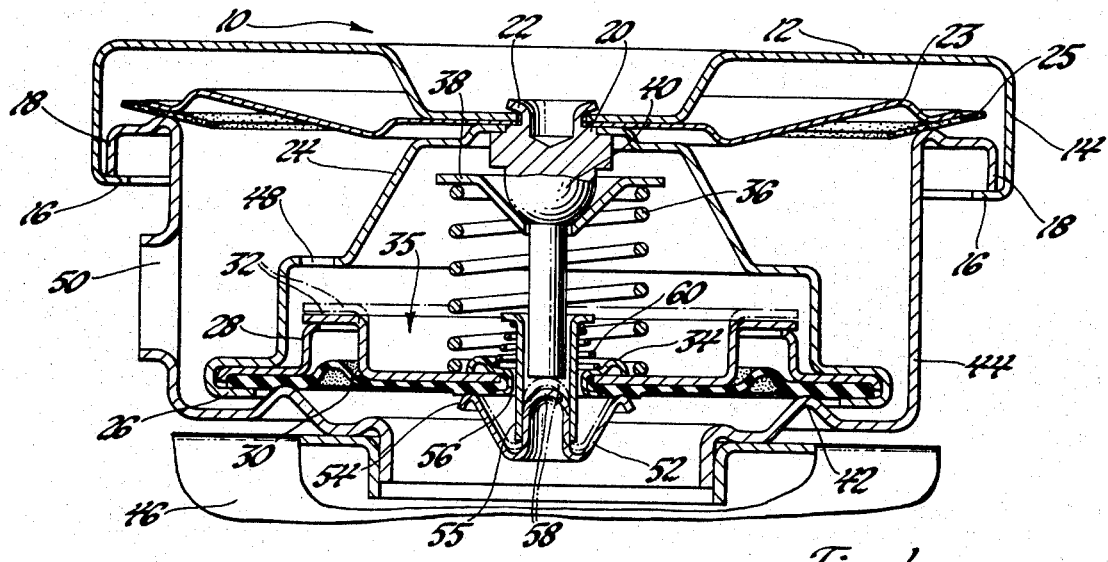
FIG. 1 is a cross sectional view of the radiator cap showing the vacuum relief valve under pressure and against the pressure relief valve just prior to opening of the pressure relief valve, where the respective valves have moved from the solid line position to the dotted line position to illustrate the movement of the members when pressure is applied to the diaphragm.

Radiator cap 10 is made up of an outer closure member 12 having a generally circular configuration with an outer edge having a depending skirt or turned down flange 14 with said skirt having a plurality of lugs or fingers 16 that mate and engage with a cam surface 18 on the filler neck. The lugs and cam surface provide the means for tightening the cap and clamping or holding the radiator cap in the installed position on the filler neck. Attached to a center post beneath closure member 12 is a disc shaped sealing gasket 23 generally made of thin metal. A second gasket 25 is secured on the outer edge of disc member 23 and is generally made of rubber or the like. These two gaskets provide a tight seal between the radiator cap and the upper rim of the filler neck. Such gaskets and their use are well known in the art.

A center post 20 is attached to the outer closure member 12 by a peened over end 22 or any conventional means of holding the center post to the closure member such as separate rivets, brazing, welding, and the like. Attached or connected to the center post, between the outer closure member 12 and the peened end of center post 20 is a generally circular bell shaped body member 24 having turned over edges 26 at the end opposite the attachment to the closure member. The turned over edges 26 are generally U-shaped to accept a reinforcing S-shaped stop member 28 and diaphragm 30. Above diaphragm 30 there is located a generally L-shaped reinforcing member 32 opposite and above the U-shaped member 26 that with reinforcing stop member 28 acts to limit the downward movement of the diaphragm. A clip 34 holds the reinforcing L-shaped member and diaphragm in assembled relation adjacent to but away from the center post 20. It is understood that the generally circular bell shaped member 24, the turned over edges of the member 26, reinforcing stop members 28, diaphragm 30 and the reinforcing L-shaped member 32 along with clip 34 make up the pressure relief valve member or assembly 35 of the cap. At the outside edge of bell shaped member 24, there is located a plurality of openings 48, the function of which will be explained later. It is understood that holes 48 can be located at any convenient location on member 24.

Located at the center of the radiator cap and around the center post is a first spring 36 that acts against the diaphragm to seat the pressure relief valve assembly in its closed or downward position. The spring member acts against the L-shaped member 32 at one end and against a generally U-shaped member 38 and ball 40 that acts as a means of holding the spring in its proper position. It is readily understood that the U-shaped member and ball could be eliminated and the spring seated directly by some convenient means against the closure member 12, or the spring could be seated on the bell shaped member 24. Filler neck 44 is attached by any convenient means such as welding, brazing or the like to the radiator 46. Within filler neck 44 there is provided an overflow opening 50. An over pressure condition in the radiator is relieved through valve member 35, openings 48 and 50. Vacuum relief is through the same openings, with flow being in the opposite direction.

A vacuum relief valve 52 is centrally located about center post 20 that has a generally circular cover plate portion 54 attached to a circular body 55 that fits over the center post 20 and is located between the center post and the diaphragm assembly 35. The circular cover plate 54 of the vacuum relief valve is of a size that it covers opening 56 between the pressure relief valve 35 and center post 20. The body 55 is constructed so as not to close the entire opening between the center post and the pressure relief valve assembly, but allows for an opening at 56 when the pressure and vacuum relief valves are functioning. The vacuum relief valve also has a stop member 58 integrally formed in cover plate 54 that acts in conjunction with the center post 20 to provide a stop for the upward movement of the vacuum relief valve. A second spring 60 acts to move the vacuum relief valve against diaphragm 30 to close the opening at 56.

Figure 2:
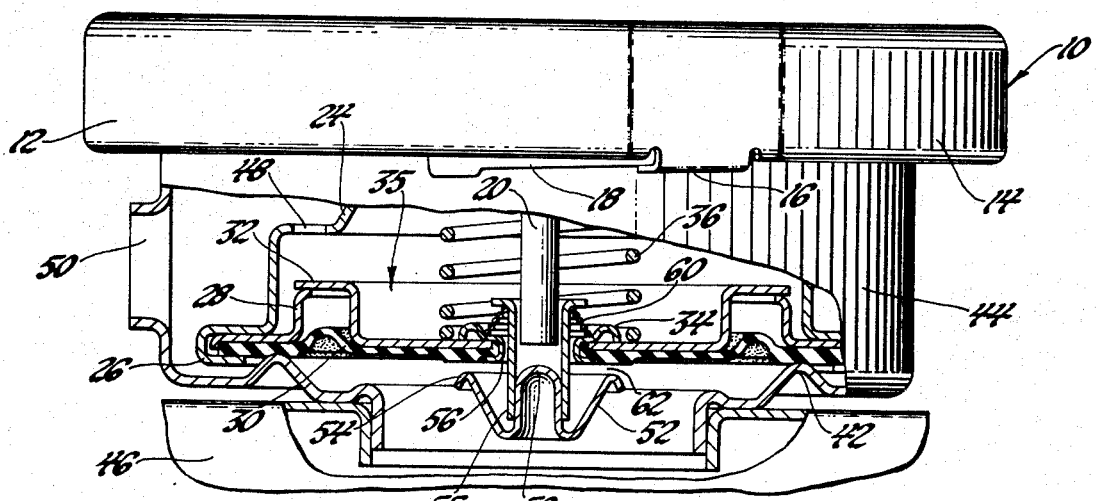
FIG. 2 is a view similar to FIGS. 1 and 3 showing the vacuum relief valve in the fully open position.

Radiator caps well known in the art have two functions and as previously stated these functions are to relieve overpressure or vacuum pressure. The vacuum relief function of our invention can best be explained by referring to FIG. 2.

Vacuum relief valve 52 has moved against spring 60 from its position noted in FIG. 1 to an open position. This permits the vacuum to be relieved through the opening 56 located between the diaphragm assembly and the vacuum relief valve 52. When the radiator pressure equals outside pressure, relief valve 52 is moved by spring 60 to its original closed position.

Figure 3:
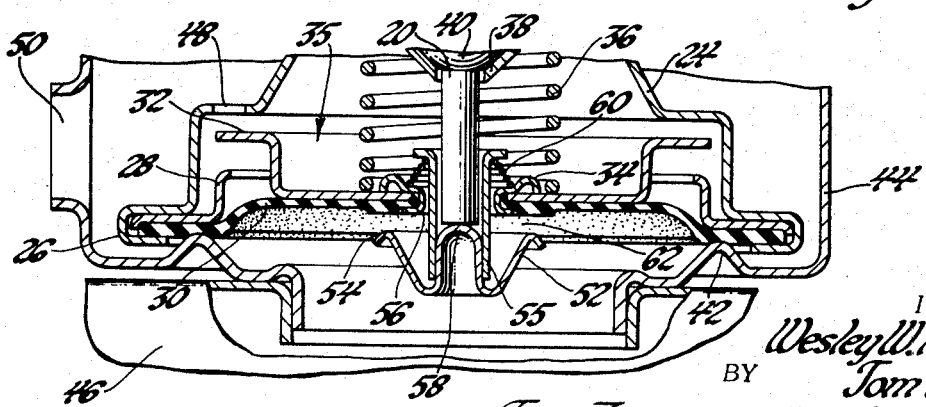
FIG. 3 is a view similar to that of FIG. 1 showing the pressure relief valve in the fully open position.

The pressure relief function of the valve can best be explained by referring to FIG. 3. When the pressure in the radiator reaches a point of over-pressure which may be caused by an overheat condition or the loss of fluid or the like, the pressure pushes against the vacuum relief valve 52 already held in contact with the diaphragm through spring 60 to more tightly close and keep closed opening 56. The vacuum relief valve will continue to move upwardly until stop member 58 comes in contact with center post 20. At this point, the vacuum relief valve can obviously move no further. When the pressure in the radiator increases beyond this point, pressure relief valve 35 moves away from the vacuum relief valve 52 to form a passage 62 between the pressure relief valve and the diaphragm assembly 35 allowing the over-pressure condition in the radiator to be relieved through the openings 62, 56, 48, and 50. As the radiator cools the relief valve 35 relaxes to return to the original position shown in FIG. 1. The vacuum relief valve will be returned to the dotted position shown in FIG. 1.

The invention provides for a radiator cap having a vacuum and pressure relief valves with single point of discharge so that any dirt that may have accumulated due to pressure relief will be removed by subsequent vacuum relief, or vice versa. In addition, the pressure relief valve is seated within the radiator filler neck at all times because of center discharge of the valves, whereas in the prior art, the pressure relief valve is seated on the filler neck which is the discharge point, and when an over-pressure condition occurs the valve is lifted from the seat; at times causing poor seating of the valve due to collection of dirt on the seat, as well as the chance that the valve member could be reseated at an angle.

It will be understood that while the invention has been described with reference to specific embodiments thereof, various changes may be made within the full and intended scope of the claims which follow.

We claim:

1. In a radiator closure cap for cooperation with the radiator filler neck of a closed fluid cooling system, the cap comprising an outer circular closure member having lugs for attachment to the filler neck, a metal disc sealing member attached to the inner surface of said circular closure member and a gasket member adjacent the outer edge of said disc member that together provide a nonreleasing seal between said radiator cap and the upper rim of the filler neck upon securing said cap thereon, a center post member attached to the inner surface of said circular closure member, a generally circular cup shaped body member open at one end surrounding said center post and secured at its closed end to the said circular closure member by said center post, a plurality of openings in the side of said cup shaped member to interconnect the filler neck with the inside of the cup shaped member, an annular flexible fluid tight diaphragm secured at its outer edge to the open end of said cup shaped body member in fluid tight relationship therewith and being adapted to form a nonreleasing seal between said cup shaped member and a sealing surface formed on the lower part of the filler neck, the inner edge of said annular diaphragm being spaced apart from the surface of said center post to provide a fluid passage therebetween to permit movement of fluids between the radiator side of said annular diaphragm and the opposite side thereof, a relief valve mounted on said center post and seating on said radiator side of said annular diaphragm to seal said fluid passage, a relatively light spring urging said relief valve into sealing contact with said annular diaphragm to seal said fluid passage, a relatively heavy spring urging said annular diaphragm toward the radiator, and means on said center post to limit the movement of said relief valve as it follows the movement of said annular diaphragm away from the radiator toward said closure cap whereby excessive pressure in the radiator moves the annular diaphragm against the force of said heavy spring opening said relief valve to vent pressure from the radiator to the filler neck through the openings in said cup shaped body member when said relief valve is stopped by said limit means, vacuum in said radiator being equalized by the movement of said relief valve against said light spring force and away from said diaphragm.

2. In a radiator cap as set forth in claim 1, wherein said relief valve has a generally circular body member between said diaphragm and center post in the fluid passage which surrounds said center post, said relief valve being retained in such position by spring means and further having stop means thereon adapted to cooperate with said center post to limit movement by said relief valve away from said radiator.

3. The radiator cap as set forth in claim 1 having means on said cup shaped body member and means on said flexible fluid tight diaphragm that cooperate to limit the movement of said diaphragm.

* * * * *